UNITED STATES PATENT OFFICE.

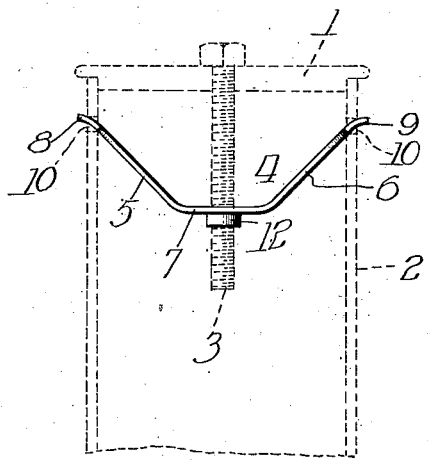
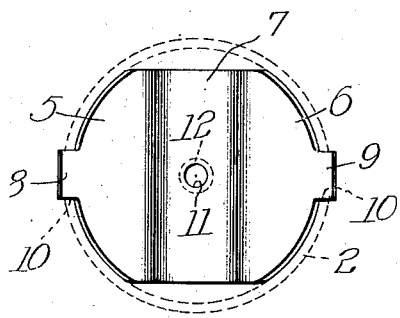
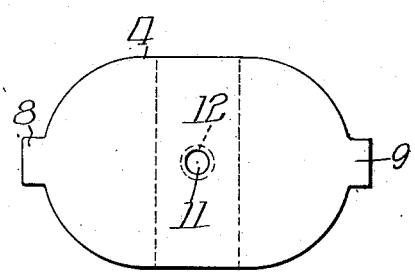
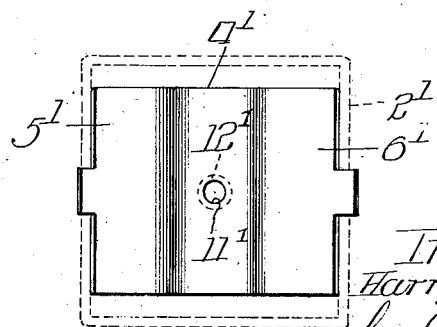

HARRY ANSCHUTZ, OF CHICAGO, ILLINOIS, ASSIGNOR TO FRANCIS W. ADAMS, OF CHICAGO, ILLINOIS.

ANCHOR-PLATE.

1,047,727.   Specification of Letters Patent.   Patented Dec. 17, 1912.

Application filed August 22, 1910. Serial No. 578,414.

*To all whom it may concern:*

Be it known that I, HARRY ANSCHUTZ, a citizen of the United States, and a resident of Chicago, in the county of Cook and State of Illinois, have invented certain new and useful Improvements in Anchor-Plates, of which the following is a specification.

This invention relates to anchor plates for connecting screw studs, bolts, and the like, to the ends of hollow members.

The object of the invention is to provide an anchor plate for this purpose, which will be effective for its designed purpose, strong, rigid and durable, and which can be produced at small cost.

To this end an anchor plate of my invention comprises the various features and details of construction hereinafter described and claimed.

In the accompanying drawing, in which my invention is fully illustrated,—Figure 1 is a side view of an anchor plate of my invention, shown as applied for securing a cap or head to a hollow member, both indicated in dotted lines. Fig. 2 is a top plan view of my improved plate, the cap being removed and the hollow member being indicated in dotted lines. Fig. 3 is a plan view of a blank, adapted for making the form of anchor plate shown in Figs. 1 and 2; and Fig. 4 is a view similar to Fig. 2, showing the anchor plate and hollow member as square or rectangular.

For purposes of concrete illustration, I have, in the drawing, shown an anchor plate of my invention as applied for connecting a cap 1 to the end of a hollow member 2, by means of a bolt or screw stud 3, all of which are indicated in dotted lines.

My improved anchor plate, designated as a whole by the reference numeral 4, is made of sheet metal, preferably thin sheet steel, which will render said plate slightly resilient. Said plate comprises inclined end portions 5 and 6, which diverge in the direction of the strain to which said anchor plate will be subjected in use. As shown, also, said plate comprises a flat portion 7, intermediate the end portions 5 and 6. Formed on the end portions 5 and 6, preferably at the extreme ends thereof, are projections 8 and 9 which, in use, are designed and adapted to engage corresponding holes, indicated at 10, in the hollow member 2.

The over-all length of the anchor plate 4 is preferably slightly greater than the diameter of the hollow member 2, with which it is to be used, the resilience of said plates permitting them to be compressed for the purpose of inserting them into the hollow member 2 and also causing them to expand to effect engagement of the projections 8 and 9 with the holes 10 in the side of said hollow member.

The screw stud or bolt 3 may be secured to or engaged with the anchor plate 4 in any desired manner. In the preferable construction shown, said anchor plate is provided with a substantially central screw threaded hole or opening 11, adapted for engagement by a screw threaded section of said screw stud or bolt.

Where the sheet metal from which the plate 4 is formed is relatively thin, as shown in the drawing, the screw threaded hole or opening 11 therein is preferably extended by means of a flange 12 around the same, which can be conveniently formed by stamping up the metal removed in forming said hole 11.

The ends of the inclined portions 5 and 6 of the anchor plate 4 conform substantially to the inside of the hollow member 2. As shown in Figs. 1 and 2, the hollow member 2 is round and the inclined ends of the anchor plate 4 are rounded to correspond thereto. As shown in Fig. 4, the hollow member, designated $2^1$, is rectangular and the ends of the inclined portions, designated $5^1$ and $6^1$, of the anchor plate, designated $4^1$, are made straight, so as to conform to the inside thereof. Instead of the holes 10, my invention contemplates the use of any form of lodgment for the ends of the plate 4.

I claim:—

1. An anchor plate for connecting a screw-stud, bolt, or the like, into the end of a hollow member, comprising inclined end portions adapted for engagement with lodgments on the side walls of said hollow member, and means adapted for connecting a screw-stud, bolt, or the like, to said plate, said anchor plate being constructed and arranged to be inserted inside of said hollow member with its inclined end portions diverging in the direction of the stress to which said plate will be subjected in use, substantially as described.

2. An anchor plate for connecting a screw-stud, bolt, or the like, into the end of a hollow member, comprising inclined end portions, projections on said end portions adapted to engage holes formed in the side walls of said hollow member, and means adapted for connecting a screw stud, bolt, or the like, to said plate, said anchor plate being constructed and arranged to be inserted inside of said hollow member with its inclined end portions diverging in the direction of the stress to which said plate will be subjected in use, substantially as described.

3. An anchor plate for connecting a screw-stud, bolt, or the like, into the end of a hollow member, made of resilient sheet metal and comprising inclined end portions, projections on said end portions adapted to engage holes formed in the side walls of said hollow member, and means adapted for connecting a screw-stud, bolt, or the like, to said plate, said anchor plate being constructed and arranged to be inserted inside of said hollow member with its inclined end portions diverging in the direction of the stress to which said plate will be subjected in use, substantially as described.

4. An anchor plate for connecting a screw-stud, bolt, or the like, into the end of a hollow member, comprising inclined end portions and an intermediate plane portion, projections on said inclined end portions adapted to engage holes formed in the side walls of said hollow member, and means adapted for connecting a screw-stud, bolt, or the like, to said plate, said anchor plate being constructed and arranged to be inserted inside of said hollow member with its inclined end portions diverging in the direction of the stress to which said plate will be subjected in use, substantially as described.

5. An anchor plate for connecting a screw-stud, bolt, or the like, into the end of a hollow member, comprising inclined end portions, and projections on said end portions adapted to engage holes formed in the side walls of said hollow member, said anchor plate being provided with a screw threaded opening adapted for engaging said anchor plate with a screw-stud, bolt, or the like, substantially as described.

In testimony, that I claim the foregoing as my invention, I affix my signature in presence of two subscribing witnesses, this 13th day of August, A. D. 1910.

HARRY ANSCHUTZ.

Witnesses:
K. A. COSTELLO,
T. D. BUTLER.